Nov. 9, 1965   D. R. HUGHES   3,216,605
AUTOMOTIVE TRUNK LID SUPPORT
Filed March 21, 1963   3 Sheets-Sheet 1
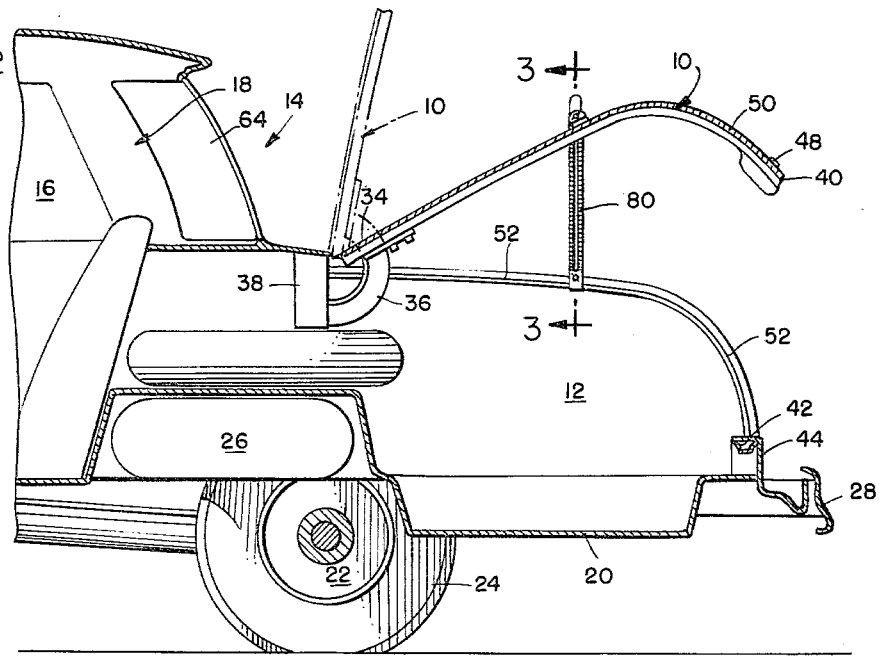
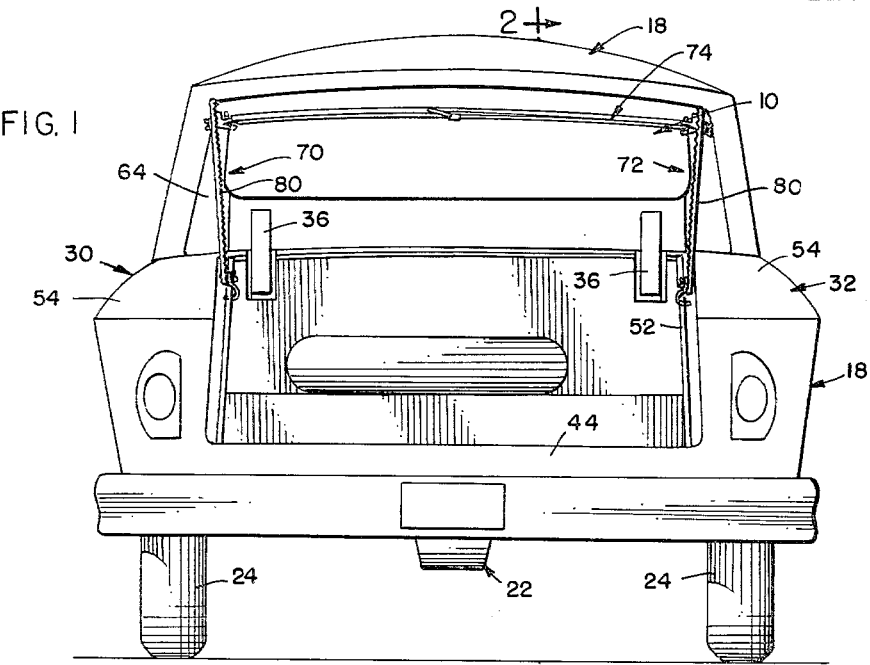
INVENTOR:
DENNIS R. HUGHES
BY
Norman R Gerlach
ATT'Y

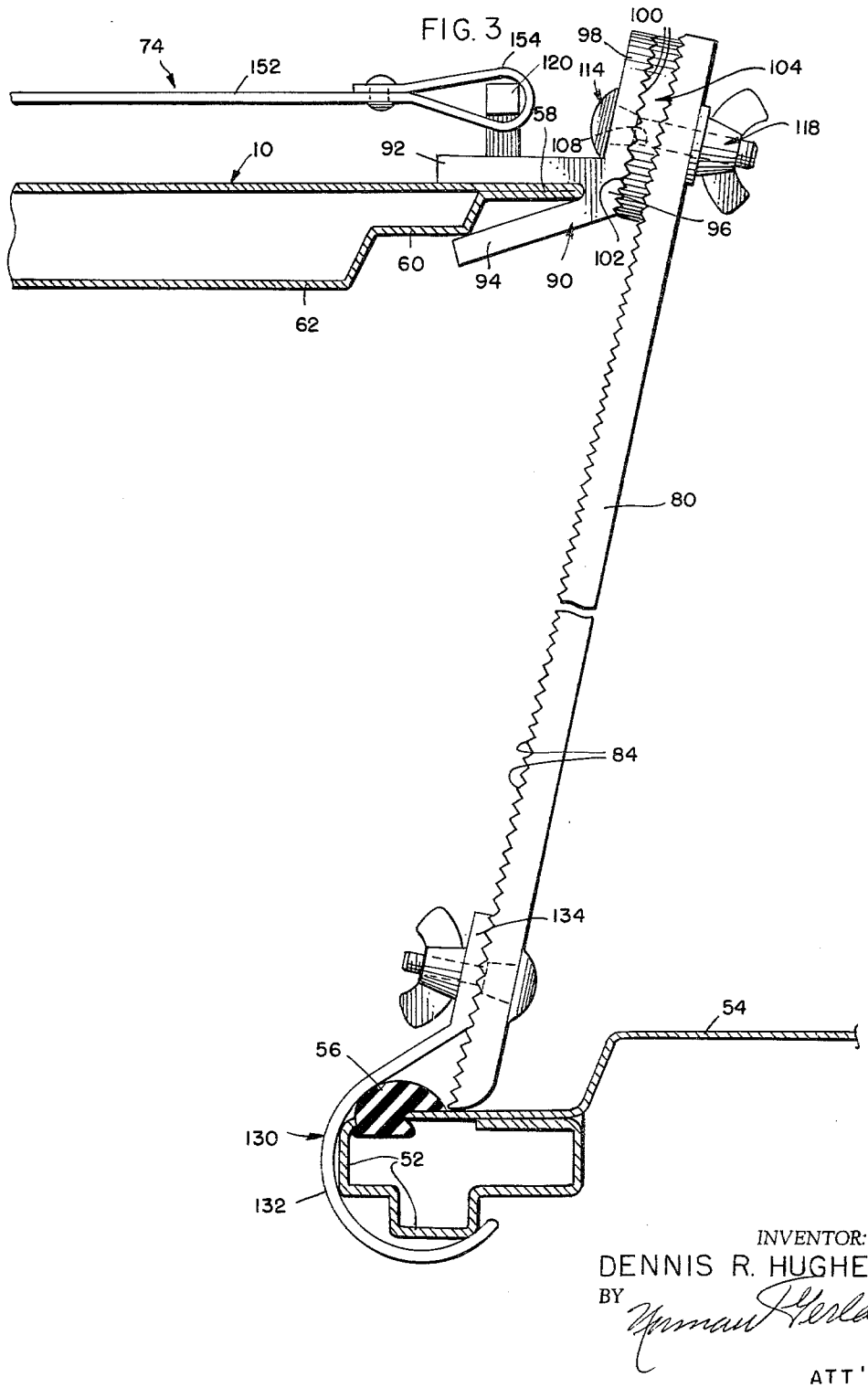

Nov. 9, 1965 D. R. HUGHES 3,216,605
AUTOMOTIVE TRUNK LID SUPPORT
Filed March 21, 1963 3 Sheets-Sheet 3
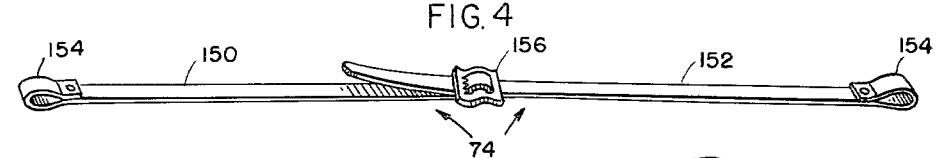
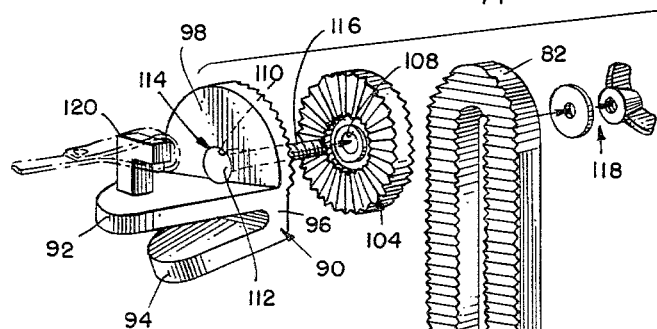
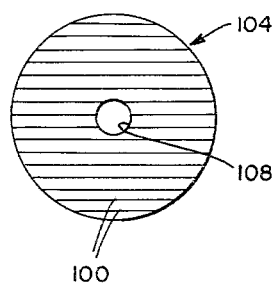
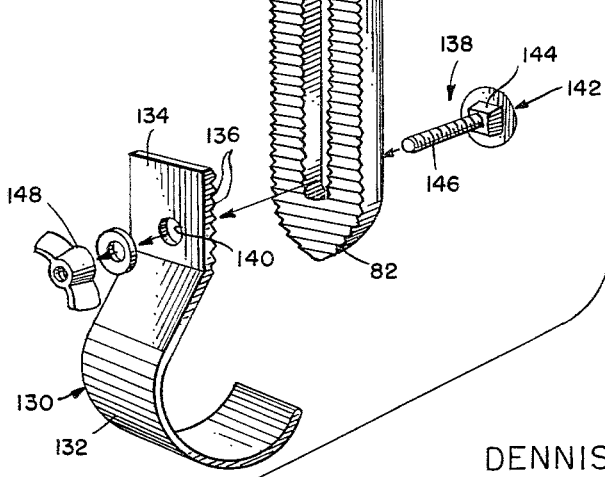
INVENTOR:
DENNIS R. HUGHES
BY
ATT'Y

United States Patent Office 3,216,605
Patented Nov. 9, 1965

3,216,605
AUTOMOTIVE TRUNK LID SUPPORT
Dennis R. Hughes, 10606 S. Campbell Ave., Chicago, Ill.
Filed Mar. 21, 1963, Ser. No. 266,894
2 Claims. (Cl. 217—61)

The present invention relates to a bracket assembly which has been designed for use as an automotive lid support and is selectively operable to maintain the hinged closure lid of an automobile trunk or luggage compartment in various partially open positions to the end that objects which are too large to fit within the trunk may be accommodated and the lid securely held against upward and downward swinging movements.

An automobile owner frequently encounters a situation where it is necessary to use his or her automobile to transport an object such as a piece of furniture or a group of objects which, when placed within the trunk of the automobile, will not permit complete closing of the hinged lid for the trunk. Such a trunk lid is usually spring-biased so that it will assume stable positions in its fully open and approximately closed positions but will not remain stable in various intermediate positions. Under such circumstances, when transporting an oversize object, it is necessary to tie the trunk lid in a partially closed position over the object to prevent the lid from moving to its fully open or raised position where it obscures the view of the driver through the rear window of the automobile. Such tying of the lid presents an inconvenience in that the necessary strap or rope is not always at hand and, furthermore, many trunk lids are not equipped with proper anchor points for tying operations. Still further, the only reaction point available on the automobile chassis for the typing operation usually is the rear bumper, and this instrumentality invariably is a part of the wheel supported framework while the trunk lid is a part of the spring-supported automobile body. Thus, when a strap, rope or other tying means is stretched taut between the bumper and the trunk lid, the chassis-supporting springs are placed under tension and when the traveling automobile encounters a road depression or bump, there is a likelihood that either the tying means will break or the object will become compressed and thus damaged.

The present invention is designed to overcome the above-noted limitation that is attendant upon the transporting of oversize objects in an automobile trunk and, accordingly, it contemplates the provision of a novel trunk lid support which is readily adjustable, and when in use, may be adjusted to hold the trunk lid in any desired intermediate position between its fully open and fully closed positions.

The provision of a support of the character briefly outlined above being among the principal objects of the invention, it is a further object to provide such a support wherein the associated fastening means for attachment to the trunk lid and to the vehicle body respectively require no modification whatsoever of either the lid or body and entail no hole drilling, notching, slotting or other preparatory operations.

Another object of the invention is to provide such a trunk lid support which has universal application to a wide variety and styles of trunk lids and vehicle bodies.

A further object of the invention is to provide an automotive trunk lid support which may be quickly and easily installed, readily knocked down, and conveniently stored in the trunk when not in use.

The provision of an automotive trunk lid support which is simple in its construction and, consequently, may be manufactured economically; one which is rugged and durable and, therefore, will withstand rough usage; one which is comprised of relatively few parts and, therefore, is unlikely to get out of order; and one which is attractive in its appearance and pleasing in its design, are further desirable features which have been borne in mind in the production and development of the present invention.

Other objects and advantages of the invention, not at this time enumerated, will become more readily apparent from a consideration of the following detailed description.

In the accompanying three sheets of drawings forming a part of this specification, one illustrative embodiment of the invention has been shown.

In these drawings:

FIG. 1 is a rear elevational view of an automobile having the improved trunk lid support operatively applied thereto;

FIG. 2 is a sectional view taken on the line 2—2 of FIG. 1;

FIG. 3 is an enlarged fragmentary view taken on the line 3—3 of FIG. 2;

FIG. 4 is a perspective view of a strap assembly forming a part of the present invention;

FIG. 5 is an exploded perspective view illustrating the details of one of two identical bracket assemblies forming parts of the invention; and FIG. 6 is a plan view of an adapter ring forming a part of the present invention.

Referring now to the drawings in detail, and in particular to FIGS. 1 and 2, the automotive trunk lid support of the present invention is shown as being operatively applied to the trunk lid 10 of the trunk or luggage compartment 12 of an automobile 14 of the passenger type. The automobile 14 is of conventional or standard design and only the rear portion of it has been illustrated herein, the illustrated portion including a passenger compartment 16, a vehicle body 18, a floor deck 20, a rear axle assembly 22, rear wheels 24, fuel tank 26, and a rear bumper 28.

As is conventional with most passenger automotive vehicles, the trunk 12 is defined by a portion of the deck 20 in combination with two fender side mounts 30 and 32 and also the lid 10. The lid 10 is hinged at its proximate front or edge region 34 by means of two offset hinge assemblies 36 which are suitably mounted on the body 18. A conventional lock and latch assembly 38, the details of which have not been fully disclosed herein, is carried medially of the distal edge region 40 of the lid 10 and cooperates with a lock reaction bracket 42 on the rear deck ledge 44. Other illustrated portions of the automobile 14 appearing herein have not been described inasmuch as they are incidental disclosures having no direct bearing upon the present invention.

As best seen in FIG. 2, the trunk lid 10 is substantially planar throughout a major portion of its extent and in the distal regions thereof is curved as at 50 to accommodate the curvature of the box edges 52 (see also FIG. 3) which extend along the inner edges of the fender overhang strips 54 of the fender side mounts 30 and 32. These box edges 52 constitute a jamb for the trunk lid 10 and are provided with the usual rubber or other elastomeric sealing strips 56 which cooperate with the lateral folded edge regions 58 of the lid 10 when the lid is in its closed position. As shown in FIG. 3, the lid 10 is of hollow sheet metal construction and the folded edge regions 58 continue inwardly to provide intermediate offsets 60 and a central offset 62. The lid 10 is movable bodily between the fully open position wherein it is shown in dotted lines in FIG. 2 and a fully closed position wherein it makes sealing contact with the elastomeric strips 56 and effectively closes the trunk 12.

It is to be noted that when the lid 10 is in its fully open position, it extends approximately vertically and the rearward vision of the occupants of the passenger compartment 16 through the rear window 64 is obstructed. Normally, as is the case in connection with most passenger automobiles, the hinge assemblies 36 are such that the lid 10 is biased by a dead center cam arrangement toward its fully open position so that, if the lid is not securely latched or locked in its closed position, it will eventually swing under the influence of road shocks and the like to its fully open position. Therefore, when oversize objects are carried in the trunk 12, it is desirable that the lid 10 be closed upon these objects as far as possible in order that the passenger's rear vision shall not be obstructed.

The automotive trunk lid support of the present invention is designed to maintain the trunk lid 10 in any selected intermediate position, as, for example, the position wherein it is shown in full lines in FIG. 2, and the lid when so maintained is securely held against swinging movement in either direction about the effective axis of the hinge assemblies 36 so that the lid offers a degree of hold-down stability to such oversize objects as are being transported in the trunk 12 of the automobile 14.

Referring now to all views of the drawings, the automotive trunk lid support of the present invention involves in its general organization three principal assemblies, namely, two identical bracket assemblies 70 and 72, and a connecting strap assembly 74. The bracket assembly 70 serves to support the left-side edge of the lid 10, while the bracket assembly 72 serves to support the right-side edge of the lid as shown in FIG. 1. The strap assembly 74 connects the two assemblies 70 and 72. The bracket assemblies 70 and 72, being identical, are, of course, interchangeable.

As clearly shown in FIG. 5, each bracket assembly comprises a vertically-disposed thrust bar 80 which is of elongated design and has the ends thereof curved or rounded as at 82. The bar is generally flat and one face thereof is provided with a series of serrations 84. The latter extend transversely of the bar 80 and the series of serrations is coextensive with the longitudinal extent of the bar. The bar 80 is formed with an elongated longitudinally extending slot 86 therein, such slot terminating a short distance inwards of the end extremities of the bar.

The upper end region of the bar 80 is adapted to be secured to the trunk lid 10 along one side edge thereof, while the lower end region of the bar is adapted to be secured to the box edge 52 of the subjacent fender mount overhang strip 54, the particular region of attachment in either instance being dependent upon the degree to which it is desired that the trunk lid 10 be maintained open. If the trunk opening is wide, the points of attachment will be commensurately close to the forward region of the trunk 12. If the trunk opening is narrow, the points of attachment will be commensurately close to the rear region of the trunk. Alternatively, adjustment of the angular position of the trunk lid may be effected by reason of the inherent adjustability of the bracket assemblies 70 and 72 themselves, as will be made clear presently.

The attachment means whereby the upper end region of each bar 80 may be secured to the trunk lid 10 comprises a forked saddle member 90 having diverging legs 92 and 94, and a connecting bight portion 96. The latter is formed integrally with an upstanding semi-circular flat base part 98. The side of the base part that is remote from the legs 92 and 94 is provided with an arcuate series of radial serrations 100 which cooperate with a series of similar serrations 102 on one side of an adapter ring 104. The other side of the adapter ring 104 is formed with a series of chordal linear serrations 106, and they are designed for mating cooperation with the serrations 84 at the upper end region of the bar 80. The adapter ring 104 is formed with a central opening 108 therethrough, and the semi-circular base part 98 of the saddle member 90 is formed with a registering hole 110 therethrough, the latter hole being square in order to receive the square head 112 of a lag bolt 114. The threaded shank portion 116 of the lag bolt 114 passes through the holes 110 and 108 and through the slot 86 in the bar 80, and a wing nut and washer assembly 118 serves to clamp the various parts together in any selected position of vertical adjustment of the saddle member 90 with respect to the bar 80. An L-shaped attachment lug 120 is integrally formed on the upper leg 92 of the saddle member 90 for a purpose that will become apparent presently.

The attachment means whereby the lower end region of each bar 80 may be secured to the adjacent box edge 52 of the subjacent fender overhang strip 54 comprises a hook-like sling member 130 having a curved hook portion 132 which is adapted to extend around and underlie the adjacent box edge 52. The last mentioned attachment means also comprises an upstanding attachment flange 134 by means of which the sling member is secured to the lower region of the bar 80. One face of the flange 134 is provided with a series of linear serrations 136 which are designed for mating engagement with the serrations 84 on the bar 80.

The flange 134 is formed with a hole 140 therethrough, and a lag bolt 142 having a squared head 144 and a threaded shank 146 cooperates with a wing nut and washer assembly 148 in clamping together the various parts of the attachment means for the tower end of the bar 80. The squared head 144 of the lag bolt 142 fits snugly within the slot 86 of the bar 80 so that the bolt cannot turn, and the threaded shank 146 passes through the slot 86 and the hole 140. The various parts are so adjusted that the extreme lower end of the bar 80 rests upon and is supported by the box edge 52 of the overhang strip 54.

The strap assembly 74 includes a pair of strap sections 150 and 152, each section having a looped proximate end 154. The strap section 150 carries a conventional buckle 156 at its distal end, the buckle being designed for sliding and clamping cooperation with the medial region of the strap 152.

In setting up the automotive trunk lid support of the present invention, the bracket assemblies 70 and 72 are successively mounted on their respective box edges 52 by loosening the wing nuts of the assemblies 148 and positioning the parts as shown at the lower region of FIG. 3, after which said wing nuts are tightened. When in position, the hook portions 132 of the sling members 130 encompass major portions of the box edges 52 so that the lower ends of the bracket assemblies are prevented from inward shifting with respect to the trunk 12. After the aforementioned operations, the legs 92 and 94 of the forked saddle members 90 are caused to straddle the folded side edges 58 of the trunk lid 16, as shown at the upper region of FIG. 3. Thereafter, the looped outer ends of the strap sections 150 and 152 are placed over the L-shaped attachment lugs 120, and the buckle 156 of the strap assembly 74 is tightened to draw the upper ends of the bracket assemblies toward each other so as to engage the trunk lid securely therebetween. Thereafter, the wing nuts of the assemblies 118 are tightened on the lag bolts 114.

It will be understood that, depending upon the degree to which the trunk lid is to be maintained open, the positions of the bracket assemblies 70 and 72 along the box edges 52 may be adjusted, or alternatively, a suitable medial position along these edges may be selected and the elevation of the lag bolts 114 and their associated clamping parts with respect to the slots 86 may be adjusted. The adapter rings 104 are readily adaptable to positioning along any portion of the side edges of the trunk lid 10 by reason of the radial disposition of the selectively mating radial serrations 100 and 102 on the saddle member 90 and the ring 104, respectively.

The invention is not to be limited to the exact arrangement of parts shown in the accompanying drawings or described in this specification as various changes in the details of construction may be resorted to without departing from the spirit or scope of the invention. The specific mode of operation or use of the trunk lid support likewise may be varied to suit conditions which may be encountered. For example, if desired, a single bracket assembly 70 may be employed for supporting one side edge of the trunk lid 16 and the strap assembly 74 and the other bracket assembly 72 may be dispensed with. In small compact-type cars where the weight of the trunk lid is not great, a single lid support may be found adequate for lid-supporting purposes. Therefore, only insofar as the invention has particularly been pointed out in the accompanying claims is the same to be limited.

I claim:

1. The combination with an automotive trunk body providing a lateral trunk lid jamb, and a trunk lid mounted on said body for swinging movement toward and away from said jamb, of a trunk lid support in the form of a bracket assembly comprising an elongated thrust bar one side of which is formed with a series of horizontal serrations, said thrust bar being provided with an elongated slot therein extending in the axial direction of the bar, a forked saddle member provided with a pair of diverging legs which straddle a side edge of the trunk lid and confine said side edge therebetween, said saddle member being provided with a circular face having horizontal serrations thereon, an adapter ring interposed between the serrated face of the saddle member and the serrated side of the thrust bar, the opposite faces of said adapter ring being provided with serrations mating with the serrations of the saddle member and thrust rod respectively, a clamping bolt projecting through the adapter ring, saddle member and slot in the thrust bar for clamping the same together in operative adjusted relationship, and means on the lower end of said thrust bar releasably securing the thrust bar to said jamb.

2. The combination set forth in claim 1 and wherein the securing means for the lower end of the thrust bar comprises a hook-like sling member underlying said jamb, extending upwardly around the jamb and having an attachment flange thereon disposed above the level of said jamb, said attachment flange having a series of horizontal serrations thereon mating with the serrations on the thrust bar in the lower region of the latter, and a clamping bolt projecting through said attachment flange and slot in the thrust bar for clamping the same in operative adjusted relationship.

References Cited by the Examiner
UNITED STATES PATENTS

| | | | |
|---|---|---|---|
| 619,243 | 2/99 | Wiard | 190—26 |
| 784,085 | 3/05 | Upson | 292—276 |
| 876,900 | 1/08 | Edwards | 217—66 |
| 954,360 | 4/10 | Thain | 190—26 |
| 1,079,466 | 11/13 | Becker | 217—61 |
| 1,486,545 | 3/24 | Reeder | 217—56 |
| 2,434,598 | 1/48 | Stegall | 248—355 |
| 2,861,767 | 11/58 | Oves et al. | 248—356 |
| 2,919,946 | 1/60 | Miener | 217—60 |
| 2,974,989 | 3/61 | Hilbers | 217—60 |
| 2,983,413 | 5/61 | Verwers. | |
| 3,092,362 | 6/63 | Walsh | 248—291 |

THERON E. CONDON, *Primary Examiner.*

EARLE J. DRUMMOND, *Examiner.*